Aug. 16, 1960

A. BRAUN 2,949,101

SYNCHRONIZING MECHANISM FOR INTERNAL
COMBUSTION FREE PISTON ENGINES

Filed Aug. 12, 1957

INVENTOR
Anton Braun

BY Alex. E. MacRae

ATTORNEY

United States Patent Office 2,949,101
Patented Aug. 16, 1960

2,949,101

SYNCHRONIZING MECHANISM FOR INTERNAL COMBUSTION FREE PISTON ENGINES

Anton Braun, Kingston, Ontario, Canada, assignor to Queen's University, Kingston, Ontario, Canada Filed Aug. 12, 1957, Ser. No. 677,424

3 Claims. (Cl. 123—46)

This invention relates to synchronizing mechanism for internal combustion free piston engines.

In free piston engines, a pair of opposed piston assemblies have reciprocating motion in axially aligned cylinders. Due to small differences in friction and pressure, these piston assemblies do not always work in exact relative motion with respect to each other. It is thus customary to provide means for constraining the motion of the pair of piston assemblies relative to each other and also to other parts of the engine by means of a mechanical synchronizer such as a rack and pinion, parallelogram linkage, or the like.

Each piston assembly is usually designed as a common unit having a power piston section and a compressor piston section of larger diameter than that of the power piston. Normally, the synchronizer mechanism is connected to the enlarged diameter section. Installation of the synchronizer on one side only of this piston section, as is done occasionally, results in side thrust of the pistons on their cylinder walls from two sources, namely, the synchronizing forces between the piston pairs, and the inertia forces induced by the added masses of the synchronizers themselves. Both forces may be balanced by installing a double synchronizer mechanism, i.e., one synchronizer on each side of each piston offset through an angle of 180°. The first forces can be kept fairly small in an engine of good design, and the inertia forces may be completely balanced by adding an equivalent mass on the other side of the same piston.

In both proposals for balancing the inertia forces, extra masses must be carried by the pistons, which results in an increase of their own mass to take care of the higher load and this in turn requires more strength and weight of the piston structures. As a result, this total added weight decreases considerably the frequency and consequently the power output per unit of overall weight of the engine since the entire added weight is subject to the reciprocal movement of the piston assemblies.

Furthermore, it is frequently necessary to seal off from the atmosphere the synchronizer mechanism. Moreover, if the mechanism operates in more than one chamber each of a pressure varying from the other or others, associated stuffing boxes or other sealing means are required in order that each chamber may be maintained sufficiently gas tight with respect to the other. Since the parts involved are subject to reciprocating motion, it is difficult to provide satisfactory sealing means and, in any case, the stuffing boxes and/or seals employed are subject to a high rate of wear.

It is an object of this invention to provide a synchronizer for free piston engines which is of simplified structure and wherein inertia forces are substantially reduced to render possible lower stresses and lighter construction.

Another object is to provide a synchronizer structure which results in simplified associated cooling arrangements and which permits the provision of simple means for accurately operating a fuel injector system and drive accessories.

Other objects, details and advantages of the invention will become apparent from the following description with particular reference to the accompanying drawing, in which.

Figure 1:
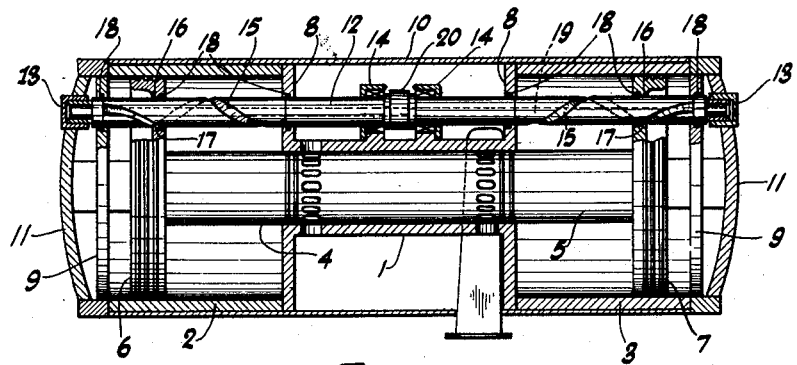
Figure 1 is a sectional side elevation of a free piston engine, with certain parts omitted for clarity of illustration, and having associated therewith a synchronizer in accordance with the invention.
Figure 2:
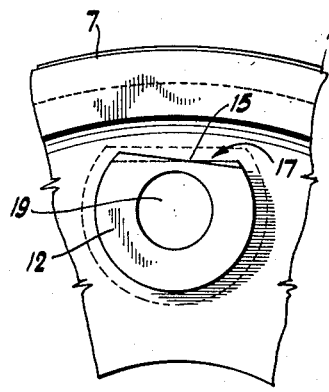
Figure 2 is a sectional end elevation of a portion of the synchronizer.
Figure 3:
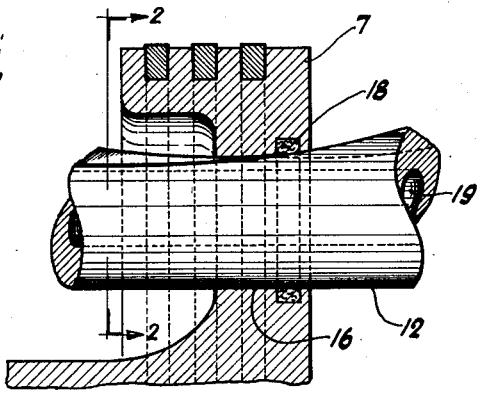
Figure 3 is an enlarged sectional side elevation of a portion of the synchronizer.

In the drawing, the free piston engine shown comprises a power cylinder 1, axially aligned compression cylinders 2 and 3, opposed power pistons 4 and 5 reciprocally mounted in power cylinder 1, and each having connected thereto for reciprocation therewith in the compression cylinders 2 and 3, a compressor piston 6 or 7. The confronting annular or apertured discs 8 close the inner end of each compression cylinder and a circular outer disc 9 closes the outer end of each compression cylinder. A casing 10 having end closure plates 11 encloses the engine.

The synchronizer in accordance with the invention comprises a synchronizer rod or bar 12 extending through the discs 8, the compression cylinders 2 and 3, the compression pistons 6 and 7, and discs 9, the ends of the bar being journalled and axially fixed in thrust bearings 13 in closure plates 11. The central portion of the bar 12 may be radially supported in bearings 14.

The portions of bar 12 within cylinders 2 and 3 are each provided with a helical recess, groove, track or the like cam surface 15. The configuration of opening 16 in each piston 6 and 7 is complementary in shape to that of the cross section of the bar 12, i.e., a track follower portion 17 of the piston projects into the recess 15 of bar 12.

Sealing of the openings in each of members 2, 3, 6, 7, 8 and 9 through which the bar 12 passes, may be effected by a sealing ring 18.

It will be apparent that, in operation, as piston assemblies 4, 6 and 5, 7 reciprocate, the portions 17 of pistons 6 and 7 will traverse helical recesses 15, the bar 12 being subjected to rotary motion under the influence thereof. As a consequence, piston assemblies 4, 6 and 5, 7 will be positively synchronized in their reciprocating movements with respect to each other and also with respect to their relative positions to the rest of the engine.

It will be apparent that, for satisfactory operation, the portions 17 of pistons 6 and 7 must traverse the helical recesses 15 with a minimum of frictional resistance. Thus, the helical recesses 15 must not be sufficiently steep as to cause self-locking of the elements 17 therein.

The bar 12 may be provided with an axial opening 19. This opening 19 may be utilized for the circulation of a cooling medium or as a passage for equalizing pressures in the various chambers through which the bar passes.

A cam 20 may be mounted on the central portion of the bar 12 to serve as a driver and timer for injection equipment and other accessories.

It will be apparent that each helical recess 15 may have an angle different from that of the other in order to effect required porting arrangements of the engine. It will also be apparent that this effect could be achieved by providing for slight axial movement of bar 12 as by means of an additional helical groove and follower adjacent the central portion thereof. In the latter case, the bar 12 would not, of course, be axially fixed as by the thrust bearings 13. This slight axial motion of the bar would result in very small inertia forces.

Figure 4:
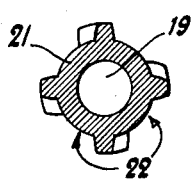
Figures 4, 5 and 6 are sectional end elevations of modified forms of synchronizer.

Figure 4 illustrates a bar 21 which is equivalent to bar 12 but which constitutes a modified form thereof. As shown, bar 21 has a plurality (four as shown) of relatively broad helical grooves 22 corresponding to the helical recess 15.

Figures 5, 6:
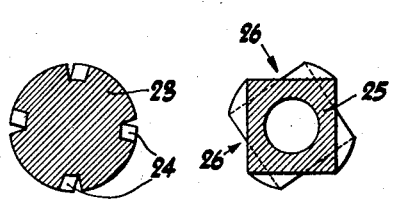

Figure 5 shows a bar 23 which is still another modified form of bar 12, and having a plurality (four as shown) of relatively narrow helical grooves 24.

Figure 6 shows a bar 25 being another modification of bar 12 and having four helical recesses 26.

It will be apparent that pistons 6 and 7 will have complementary surfaces engaging the surfaces of grooves or recesses 22, 24 and 26. It will also be apparent that many other varying shapes of helical recesses may be employed in association with a guide bar such as 12, 21, 23 and 25.

It will be observed that a synchronizer mechanism has been provided wherein, even if the overall weight of the mechanism had not been reduced as compared with conventional mechanisms, the resulting inertia forces are greatly reduced, making it possible to reduce the piston weight, thus increasing the frequency of the engine and consequently the output per unit weight of the engine.

Even if a single guide bar according to this invention is employed on one side only of the engine, side thrust is reduced considerably, as compared to the application of a conventional synchronizer on one side only. The result is an increased life of the engine.

It will be observed that, in general, the present invention contemplates the replacement of the reciprocating masses in conventional synchronizers with a comparatively slow moving revolving mass, the advantages of which may be summarized as follows:

(a) Reduced inertia forces, with resultant lower stresses or lighter construction for the same capacity.

(b) Simplified structure since one bar replaces a plurality of parts as employed in conventional mechanisms.

(c) Use of a hollow guide bar reduces weight and inertia, permits cooling and/or aids in equalizing pressures in the various chambers.

(d) A revolving guide bar makes it possible to conveniently associate therewith means for operating a fuel injector system and drive accessories.

(e) Since piston weight may be reduced, higher speeds are possible under similar thermal loads, thus increasing output per unit weight.

As previously indicated, a helix in the guide bar may be employed to impart a small axial constrained movement thereto in order to effect an unsymmetrical porting arrangement of the engine. Such an arrangement would result in a further overall reduction in size and weight of the engine.

It will be apparent that various changes may be made in the structure described without departing from the spirit of the invention.

I claim:
1. In a free piston machine having a pair of opposed spaced-apart axially-aligned compressor cylinders in which the confronting and outer ends of each of said compressor cylinders are closed by means of confronting and outer discs, respectively, and a power cylinder mounted intermediate said confronting discs of said compressor cylinders and being in axial aligned communication with said compressor cylinders and said power cylinder having a substantially smaller bore than said compressor cylinders, a free compressor piston reciprocally mounted in each of said compressor cylinders, a power piston axially joined to each of said compressor pistons, each of said power pistons being reciprocally mounted in said power cylinder, and having a means coupling the movement of said compressor pistons to bring about synchronization of their relative movements, the improvement in said synchronization means comprising, in combination, a synchronizer rod having spaced apart end portions, and a center portion, helical tracks on said end portion of said rod, one of said end portions of said rod extending through each of said compressor cylinders parallel with said axis of said compressor cylinder, and journaled for rotation in said confronting and outer disc of each of said compressor cylinders, said center portion of said synchronizer rod being spaced outward from said power cylinder, each of said compressor pistons having an aperture to receive an end portion respectively of said synchronizer rod, and track follower means operatively associated with said aperture to cause said synchronizer rod to rotate when said compressor pistons are reciprocated whereby unsynchronized relative movement of said compressor pistons is restrained.

2. In a free piston machine having a pair of opposed spaced-apart compressor cylinders with similar axially aligned bores, and having confronting ends and outer ends which are closed by confronting apertured discs and outer discs respectively, and having a power cylinder of substantially smaller bore than said compressor cylinder bore mounted intermediate of said confronting discs, said power cylinder being in communication with each of said compressor cylinders through said apertured confronting discs, a pair of piston assemblies each of said piston assemblies including a compressor piston and a power piston fixedly attached to said compressor piston, each of said compressor pistons being mounted for reciprocation in one of said compressor cylinders and its attached power piston being mounted in said power cylinder, and having a means coupling the movement of said compressor pistons to bring about synchronization of their relative movements, the improvement in said synchronization means comprising, in combination, a synchronizer rod having spaced apart end portions and a center portion, said compressor pistons and said confronting and outer discs of said compressor cylinders having aligned openings to receive said synchronizer rod therethrough so that said end portions of said synchronizer rod are mounted respectively in each of said compressor cylinders, said synchronizer rod being rotatable in said confronting and outer disc openings, said center portion of said synchronizer rod being spaced from said power cylinder, a helical cam surface on each of said end portions of said synchronizer rod, and said openings in said compressor pistons having a configuration complementary to said helical cam surface of said end portions of said synchronizer rod to mutually cam said compressor pistons to similar relative positions in said compressor cylinders during their reciprocating travel in said cylinders.

3. In a free piston machine as claimed in claim 2, a driving means mounted on said synchronizer rod for timing of said machine.

References Cited in the file of this patent
UNITED STATES PATENTS

| | | |
|---|---|---|
| 2,453,515 | Kalitinsky | Nov. 9, 1948 |
| 2,462,745 | Horgen | Feb. 22, 1949 |
| 2,741,232 | Huber | Apr. 10, 1956 |

FOREIGN PATENTS

| | | |
|---|---|---|
| 888,943 | Germany | Sept. 7, 1953 |